(12) United States Patent
Sitter et al.

(10) Patent No.: US 9,885,126 B2
(45) Date of Patent: Feb. 6, 2018

(54) METHOD FOR PRODUCING CERAMIC FIBERS OF A COMPOSITION IN THE SIC RANGE AND FOR PRODUCING SIC FIBERS

(71) Applicant: BJS CERAMICS GMBH, Gersthofen (DE)

(72) Inventors: Sandra Sitter, Munich (DE); Birgit Reiter, Regensburg (DE)

(73) Assignee: BJS Ceramics GmbH, Gersthofen (DE)

( * ) Notice: Subject to any disclaimer, the term of this patent is extended or adjusted under 35 U.S.C. 154(b) by 254 days.

(21) Appl. No.: 14/699,089

(22) Filed: Apr. 29, 2015

(65) Prior Publication Data

US 2015/0240384 A1 Aug. 27, 2015

Related U.S. Application Data

(60) Division of application No. 13/539,662, filed on Jul. 2, 2012, now abandoned, which is a continuation of application No. PCT/EP2010/070430, filed on Dec. 21, 2010.

(30) Foreign Application Priority Data

Dec. 30, 2009 (DE) .................. 10 2009 055 429

(51) Int. Cl.
*D01D 10/02* (2006.01)
*D02J 13/00* (2006.01)
*D01D 5/04* (2006.01)
*C04B 35/571* (2006.01)
*C04B 35/622* (2006.01)
*C04B 35/626* (2006.01)
*C04B 35/634* (2006.01)
*C08G 77/50* (2006.01)
*D01F 6/78* (2006.01)
*D01F 9/10* (2006.01)

(52) U.S. Cl.
CPC ............ *D01D 5/04* (2013.01); *C04B 35/571* (2013.01); *C04B 35/6264* (2013.01); *C04B 35/6267* (2013.01); *C04B 35/62281* (2013.01); *C04B 35/63408* (2013.01); *C04B 35/63432* (2013.01); *C04B 35/63436* (2013.01); *C04B 35/63444* (2013.01); *C08G 77/50* (2013.01); *D01F 6/78* (2013.01); *D01F 9/10* (2013.01); C04B 2235/483 (2013.01); C04B 2235/5264 (2013.01); C04B 2235/6021 (2013.01); C04B 2235/6022 (2013.01); C04B 2235/652 (2013.01); C04B 2235/658 (2013.01); C04B 2235/6567 (2013.01); C04B 2235/6582 (2013.01); C04B 2235/723 (2013.01); C04B 2235/96 (2013.01); D10B 2101/16 (2013.01); Y10T 428/2918 (2015.01)

(58) Field of Classification Search
CPC . C04B 35/571; C04B 35/62281; C04B 35/64; C04B 2235/6021; C04B 2235/652; C04B 2235/658; D01D 5/04; D01D 10/02; D01F 6/78; D01F 9/10; D02J 13/00
USPC ........ 264/39, 83, 85, 205, 211.17, 625, 627, 264/639
See application file for complete search history.

(56) References Cited

U.S. PATENT DOCUMENTS

| | | | |
|---|---|---|---|
| 3,892,583 A | 7/1975 | Winter et al. | |
| 4,010,233 A * | 3/1977 | Winter | C04B 35/62231 264/639 |
| 5,162,269 A | 11/1992 | Deleeuw et al. | |
| 5,171,722 A | 12/1992 | Tereki et al. | |
| 5,278,110 A | 1/1994 | Toreki et al. | |
| 5,354,527 A | 10/1994 | Frechette et al. | |
| 5,792,416 A | 8/1998 | Sacks et al. | |
| 6,103,211 A * | 8/2000 | Matsuhisa | D01F 6/18 423/447.1 |
| 6,521,025 B1 * | 2/2003 | Shilton | B01D 67/0009 264/514 |
| 2008/0207430 A1 | 8/2008 | Clade et al. | |
| 2011/0263780 A1 | 10/2011 | Ruedinger et al. | |
| 2013/0011675 A1 * | 1/2013 | Clade | C04B 35/571 428/367 |

FOREIGN PATENT DOCUMENTS

DE 102004042531 A1 12/2005
WO 2010072739 A2 7/2010

OTHER PUBLICATIONS

Toreki et al.: "Polymer-Derived Silicon Carbide Fibers with low Oxygen Content" Proceedings of the 16th Annual Conference on Composites and Advanced Ceramic Materials, Part 1 of 2: Ceramic Engineering and Science Proceedings (ed J. B. Wachtman), vol. 13, No. 7/8, Mar. 26, 2008 (Mar. 26, 2008), pp. 145-159, XP002625435.

(Continued)

*Primary Examiner* — Leo B Tentoni
(74) *Attorney, Agent, or Firm* — Laurence A. Greenberg; Werner H. Stemer; Ralph E. Locher

(57) ABSTRACT

A method for producing ceramic fibers of a composition in the SiC range, starts from a spinning material that contains a polysilane-polycarbosilane copolymer solution. The spinning material is extruded through spinnerets in a dry spinning method and spun through a spinning duct into green fibers, and the green fibers are subsequently pyrolyzed. Accordingly, the polysilane-polycarbosilane solution contains between 75 wt. % and 95 wt. %, in particular between 80 and 90 wt. %, of an indifferent solvent, and the spinnerets have a capillary diameter between 20 and 70 μm, in particular between 30 and 60 μm, in particular between 40 and 50 μm.

23 Claims, No Drawings

(56) References Cited

OTHER PUBLICATIONS

Clade et al: "A new type of precursor for fibers in the system Si-C" Journal of the European Ceramic Society, vol. 25, No. 2-3, Jan. 1, 2005 (Jan. 1, 2005), pp. 123-127, XP004655094 Elsevier Science Publishers, Barking, Essex, GB ISSN: 0955-2219.
Xue et al: "Preparation of low oxygen SiC fiber by dry spinning" Wuji Cailiao Xuebao/Journal of Inorganic Materials, vol. 22, No. 4, Jul. 2007 (Jul. 2007), pp. 681-684, XP002625436 Science Press; Research Center for Eco-Environmental Sciences; Chinese Academy of Sciences CN—English abstract.
http://www.schenectady.k12.ny.us/users/pattersont/Computer%20Prog%20Website/ConversionTable/html.2014, pp. 1-2.

* cited by examiner

METHOD FOR PRODUCING CERAMIC FIBERS OF A COMPOSITION IN THE SIC RANGE AND FOR PRODUCING SIC FIBERS

CROSS-REFERENCE TO RELATED APPLICATION

This application is a divisional of patent application Ser. No. 13/539,662, filed Jul. 2, 2012, which was a continuation of copending international application No. PCT/EP2010/070430, filed Dec. 21, 2010, which designated the United States; this application also claims the priority, under 35 U.S.C. § 119, of German patent application No. DE 10 2009 055 429.7, filed Dec. 30, 2009; the prior applications are herewith incorporated by reference in their entirety.

BACKGROUND OF THE INVENTION

Field of the Invention

The invention relates to a method for the production of silicon carbide fibers from a polysilane-polycarbosilane copolymer solution.

A method of this type is already known. As an example, published, non-prosecuted German patent application DE 10 2004 042 531 A1, corresponding to U.S. patent publication No. 2008/0207430, concerns the production of a polysilane-polycarbosilane copolymer solution and spinning that solution to green fibers that are transformed into SiC fibers by pyrolysis. The starting material for the production of the copolymer itself is formed by mixtures of methylchlorodisilanes with the composition $Si_2Me_nCl_{6-n}$ (n=1-4). In this regard, preferred methylchlorodisilanes that are used are those that are formed as the high boiling point fraction in the Müller-Rochow synthesis; since they are therefore by-products, they constitute inexpensive raw materials. They usually consist of a mixture of 1,1,2,2-tetrachlorodimethyldisilane and 1,1,2-trichlorotrimethyldisilane with less than 10% molar of other ingredients. The crude polysilane is produced by disproportionation of the disilane mixture using an organic nitrogen compound as a Lewis base as the homogeneous catalyst, preferably at a raised temperature, with the monosilane mixture that forms during the reaction as the cleavage product being continuously distilled off. After a subsequent heat treatment, the raw polysilane is rendered infusible by increasing the average molecular weight and then is converted, via a rearrangement reaction, into a polysilane-polycarbosilane copolymer (hereinafter abbreviated to "PPC"). Next, the PPC is dissolved in an inert solvent.

According to DE 10 2004 042 531 A1, fibers can be spun from a solution of this type that can be transformed into SiC fibers by a pyrolysis step. To this end, the solutions must have a 30% to 95% by weight polysilane-polycarbosilane copolymer content in order to be spinnable and thus to be able to be used as a spin dope. Because of their substantially lower viscosity, on the other hand, according to DE 10 2004 042 531 A1, solutions with substantially lower PPC contents, for example 20% by weight, can only be turned into ceramic matrixes by employing a liquid phase infiltration method.

The known method for the production of SiC fibers has the disadvantage in that with the PPC concentrations employed, relatively large capillary diameters of 75 to 300 µm are required in the spin nozzles used for spinning in order to be able to force the relatively viscous spin dope with a 30% to 95% by weight PPC content through. Thus, the green fibers obtained in the spinning duct immediately after leaving the spin nozzles have a relatively large diameter, also approximately between 75 and 300 µm. However, fibers with a final diameter after pyrolysis of substantially under 40 µm, preferably approximately 10 µm, are desired. Thus, the filaments coming out of the spin nozzles have to be stretched by very high draw rates of up to 500 m/min.

However, if as yet still unaligned lumps of polysilane-polycarbosilane copolymer molecules are present in the fiber formed from the original spin dope, they have to be straightened out by drawing them through a godet. An alignment of that type, however, contributes greatly to obtaining a high Young's modulus (abbreviated to Y modulus). In addition, a high tensile strength of the pyrolyzed fibers is favored by aligned PPC molecules, which are highly ordered within the green fibers.

Furthermore, a high degree of stretching stresses the green fibers formed a great deal and is at the origin of surface defects and other damage to the green fibers.

The known method for the production of SiC fibers also suffers from the disadvantage that trouble-free spinning is not possible. Breaks occur frequently at the nozzles so that at least for a fraction of the spin nozzles used, a joining has to be made, which either breaks a complete fiber bundle at that location or results in extremely severe inhomogeneities within the bundle. Thus, the known method cannot be used to produce a fiber bundle of homogeneous quality; in particular, the individual fibers do not all have the same diameter.

Furthermore, the SiC fibers produced using the method described in DE 10 2004 042 531 A1 have a kidney-shaped cross section. In addition, a diameter of 30 µm is relatively large.

SUMMARY OF THE INVENTION

The aim of the invention is to overcome the disadvantages mentioned above, in particular to provide a method for the production of SiC fibers, which means that the green fibers can be spun in a circumspect manner, so that undamaged or only slightly damaged SiC fibers can be obtained following transformation into ceramic fibers by pyrolysis; moreover, they have a near-circular cross section and also a high Y modulus and high strength.

In accordance with the invention, low viscosity PPC solutions with PPC contents of below 25% by weight, which previously were used only in liquid phase infiltration, can surprisingly be spun if they are extruded through nozzles with capillary diameters of 20 to 70 m, in particular 30 to 60 µm, more particularly in the range 40 to 50 µm.

This type of small nozzle capillary diameter means that, even when the spin dope leaves the nozzles, the green fibers formed have a smaller diameter that is already almost that of the target diameter of the green fibers. In this manner, the fibers do not have to be stretched much more in order to reach the desired diameter. This conserves the green fibers and results in less damage and fewer surface defects.

It is surprising that filaments can even form from the low viscosity spin dope with an extremely high solvent fraction. This is presumably only possible because the spin dope is extruded through spin nozzles with a very small nozzle capillary diameter and the filaments coming out of the spin nozzles, which have a correspondingly small filament diameter, have a high surface to volume ratio. Therefore the solvent evaporates quickly and the spin dope that is now in the form of fibers gels rapidly, and thus becomes firm enough for it not to lose its fibrous shape. Despite the small nozzle capillary diameter, and because of the low viscosity, very high throughputs are obtained so that the fibers that are formed have to be drawn at high rates just to "catch" the volume of material that is being discharged.

Furthermore, the spinning process is trouble-free and without fiber breakage using the method of the invention. Presumably gas inclusions in the low viscosity spin dope can escape upwards more easily than in higher viscosity spin dopes so that the high solvent content prevents the fibers from breaking. The small spin nozzle diameter also means that the spin dope cannot flow out of the nozzles unhindered, but have to be put under a certain (albeit very low) pressure.

In the first stretching phase, the spin dope is stretched while in free fall. Then the solvent evaporates; this can be encouraged by appropriate adjustment of the spinning duct and spin dope parameters. In this manner, sufficient solvent is removed from the fiber to result in gelling, i.e. solidification of the fiber to an extent such that it can no longer run away. In a second stretching zone, drawing at a certain winding rate can further stretch the gelled fibers. By the method of the invention, fibers are produced that have particularly good mechanical properties following pyrolysis.

Furthermore, the fibers obtained surprisingly have a generally circular cross section. It is known that prior art fibers with a kidney-shaped cross section are obtained because initially, only the sheath area of the green fibers leaving the nozzles solidifies, while the remaining core is still liquid. In the context of the invention, it has been observed that too much stretching when drawing means that the forces on the green fibers in the longitudinal direction deform the fibers. Since the core is still liquid inside the solidified sheath zone, on stretching, here and there the forces cause the fibers to collapse so that the cross section becomes kidney-shaped. This problem is surprisingly overcome in the method of the invention because the green fibers exiting the nozzles are already thin. Because of this, severe stretching using the damaging forces described is not necessary and a fiber retains the round cross section it possesses when it exits the nozzle right up to when it is wound, for example onto take-up rolls.

The term "SiC fibers" as used in the present invention means fibers with a chemical composition that is in the silicon carbide range, but wherein the atomic ratio of silicon to carbon is not necessarily exactly 1:1 but may deviate from this to a higher Si content or a higher C content, as well as other elements or compounds as impurities.

Advantageously, spinning is carried out at a draw rate in the range 50 m/min to 1000 m/min, in particular in the range 100 to 750 m/min, preferably in the range 200 to 500 m/min. These high rates mean that filament formation from a spin dope with a high solvent content is improved.

The spin dope has a viscosity in the range 0.1 to 6 Pas, in particular in the range 0.5 to 4 Pas at temperatures in the range 20° C. to 80° C. With the nozzle diameters employed, the spin dope preferably flows from the spin nozzles even at pressures from 1 bar, such as in the range 1 to 40 bar. In this manner, there is very little danger that gas under high pressure will be dissolved or included in the low viscosity spin dope and result in breakage at the spin nozzle.

Advantageously, spinning is carried out at a shear rate in the range 10,000 s$^{-}$ to 60,000 s$^{-1}$, in particular in the range 20,000 to 40,000 s$^{-1}$. By running the spin dope through spin nozzles with a very small capillary diameter at very high shear rates, the polymer molecules are forced to become highly aligned.

Preferably, the spinning duct temperature is adjusted such that after the spin dope exits the spin nozzles, the solvent evaporates even faster from the green fibers being formed. Temperatures in the range 30° C. to 160° C., in particular in the range 50° C. to 100° C., particularly preferably in the range 60° C. to 80° C. are preferred. These should be optimized for each individual case as a function of the vapor pressure curve of the solvent or solvents employed.

Preferably, a high partial counter pressure of the solvent, which is also present in the PPC solution and is usual in the prior art, is not set up in the spinning duct; in contrast, the solvent that comes out of the green fibers in the course of formation is removed more rapidly by flushing the spinning duct with a flushing gas that is free of solvent. Preferably, an inert gas is used as the flushing gas, such as nitrogen ($N_2$) or argon (Ar).

Furthermore, rapid evaporation of the solvent can be encouraged by not injecting the inert gas used during spinning as a counter-current, but by injecting it in the same direction as the fibers, from top to bottom. This prevents solvent that is evaporating from the fiber from being applied again to the fibers further up in the spinning duct and being taken up by them or at least making evaporation of the solvent from the fibers more difficult by building up a high partial pressure.

Preferred solvents for the PPC composition are: a saturated hydrocarbon selected from the group formed by n-pentane, n-hexane, cyclohexane, n-heptane, n-octane, an aromatic hydrocarbon selected from the group formed by benzene, toluene, o-xylene, syn-mesitylene, a chlorinated hydrocarbon selected from the group formed by methylene chloride, chloroform, carbon tetrachloride, 1,1,1-trichloroethane, chlorobenzene or an ether selected from the group formed by diethyl ether, diisopropyl ether, tetrahydrofuran, 1,4-dioxane or a mixture of two or more of these solvents.

The invention claimed is:

1. A method for producing ceramic fibers with a composition in an SiC range formed from a spin dope containing a polysilane-polycarbosilane copolymer solution, which comprises the steps of:
   providing the spin dope containing the polysilane-polycarbosilane copolymer solution comprising from 75% by weight to 95% by weight of an inert solvent;
   extruding the spin dope through spin nozzles in a dry spinning process with 50 to 50,000 spin nozzles and spun through a spinning duct to produce green fibers, wherein the spin nozzles have a capillary diameter in a range of 20 to 70 μm; and
   pyrolyzing the green fibers to produce ceramic fibers.

2. The method according to claim 1, which further comprises carrying out the dry spinning process at a draw rate in a range of 50 m/min to 1,000 m/min.

3. The method according to claim 1, which further comprises setting a viscosity of the spin dope in a range of 0.1 to 6 Pas.

4. The method according to claim 1, which further comprises carrying out the dry spinning process at shear rates in a range of 10,000 s$^{-1}$ to 60,000 s$^{-1}$.

5. The method according to claim 1, wherein the spin dope contains a spinning aid selected from the group consisting of polyethylene, polypropylene, polystyrene, polyvinyl chloride, polyacrylonitrile and poly(4-vinyl pyridine).

6. The method according to claim 5, which further comprises supplying a spinning aid fraction in an amount of from 0.5% to 10% by weight.

7. The method according to claim 1, which further comprises setting a spinning duct temperature to be in a range of 40° C. to 160° C.

8. The method according to claim 7, which further comprises flushing the spinning duct with an inert flushing gas that is free of solvent.

9. The method according to claim 8, which further comprises moving the inert flushing gas in a same direction as the ceramic fibers.

10. The method according to claim 1, wherein the inert solvent is a saturated hydrocarbon selected from the group consisting of n-pentane, n-hexane, cyclohexane, n-heptane, and n-octane, an aromatic hydrocarbon selected from the group consisting of benzene, toluene, o-xylene, and syn-mesitylene, a chlorinated hydrocarbon selected from the group consisting of methylene chloride, chloroform, carbon tetrachloride, 1,1,1-trichloroethane, and chlorobenzene, or an ether selected from the group consisting of diethyl ether, diisopropyl ether, tetrahydrofuran, and 1,4-dioxane or a mixture of two or more of these inert solvents.

11. The method according to claim 1, which further comprises carrying out the pyrolyzing step in an inert atmosphere or in a reducing atmosphere at temperatures in the range of 700° C. to 1,700° C.

12. The method according to claim 1, which further comprises sintering the pyrolyzed fibers at temperatures in a range of 1,000° C. to 1,500° C.

13. The method according to claim 1, which further comprises:
    providing the polysilane-polycarbosilane copolymer solution in a range of 80% by weight to 90% by weight of the inert solvent; and
    providing the spin nozzles to have the capillary diameter in a range of 40 to 50 μm.

14. The method according to claim 1, which further comprises carrying out the dry spinning process at a draw rate in a range of 100 to 750 m/min.

15. The method according to claim 1, which further comprises carrying out the dry spinning process at a draw rate in a range of 200 to 500 m/min.

16. The method according to claim 1, which further comprises setting a viscosity of the spin dope in a range of 0.5 to 4 Pas.

17. The method according to claim 1, which further comprises carrying out the dry spinning process with from 100 to 30,000 spin nozzles.

18. The method according to claim 1, which further comprises carrying out the dry spinning process with from 200 to 2,000 spin nozzles.

19. The method according to claim 1, which further comprises carrying out the dry spinning process at shear rates in a range of 20,000 to 40,000 $s^{-1}$.

20. The method according to claim 5, further comprising supplying a spinning aid fraction in an amount of from 1% to 5% by weight.

21. The method according to claim 5, further comprising supplying a spinning aid fraction in an amount of from 2.5% to 4% by weight.

22. The method according to claim 1, which further comprises setting a spinning duct temperature to be in a range of 50° C. to 100° C.

23. The method according to claim 11, which further comprises:
    selecting the inert atmosphere from the group consisting of nitrogen and argon;
    selecting the reducing atmosphere from the group consisting of a gas mixture consisting of argon, hydrogen, nitrogen, carbon monoxide, at least one carrier gas and at least one reducing gas; and
    setting the temperatures in the range of 900° C. to 1,300° C.

* * * * *